United States Patent
Gonzalez et al.

(10) Patent No.: US 10,766,201 B2
(45) Date of Patent: Sep. 8, 2020

(54) COMPENSATING FOR SHRINKING OF OBJECTS IN 3D PRINTING

(71) Applicant: HEWLETT-PACKARD DEVELOPMENT COMPANY, L.P., Houston, TX (US)

(72) Inventors: Sergio Gonzalez, Sant Cugat del Valles (ES); Alex Carruesco Llorens, Sant Cugat del Valles (ES); Lluis Abello Rosello, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 140 days.

(21) Appl. No.: 16/098,293

(22) PCT Filed: Apr. 21, 2017

(86) PCT No.: PCT/US2017/028707
§ 371 (c)(1),
(2) Date: Nov. 1, 2018

(87) PCT Pub. No.: WO2018/194630
PCT Pub. Date: Oct. 25, 2018

(65) Prior Publication Data
US 2019/0134914 A1 May 9, 2019

(51) Int. Cl.
*B29C 64/393* (2017.01)
*B33Y 50/02* (2015.01)
*G06F 30/00* (2020.01)
*B33Y 30/00* (2015.01)
*B29C 64/188* (2017.01)
(Continued)

(52) U.S. Cl.
CPC .......... *B29C 64/393* (2017.08); *B29C 64/188* (2017.08); *B33Y 30/00* (2014.12); *B33Y 50/02* (2014.12); *G05B 19/4099* (2013.01); *G06F 30/00* (2020.01); *G06F 2119/18* (2020.01)

(58) Field of Classification Search
CPC .................................................. B29C 64/393
See application file for complete search history.

(56) References Cited

U.S. PATENT DOCUMENTS

| 4,575,330 A | 3/1986 | Hull |
| 4,665,492 A | 5/1987 | Masters |
| 5,184,307 A | 2/1993 | Hull et al. |

(Continued)

FOREIGN PATENT DOCUMENTS

| CN | 105082412 A | 11/2015 |
| EP | 0250121 A2 | 12/1987 |

OTHER PUBLICATIONS

"Printing Size Error and Printer Calibration", Retrieved from Internet: http://forums.reprap.org/read.php?262,618766, Jan. 31, 2016, 3 pages.

*Primary Examiner* — Tejal Gami
(74) *Attorney, Agent, or Firm* — HP Inc., Patent Department

(57) ABSTRACT

A method comprises receiving object model data in an original coordinate system to print within a predefined usable build volume of a three dimensional printer. The method comprises receiving at least one compensation factor for the object model data to compensate for any shrinking of an object. The method comprises scaling the object model data by the at least one compensation factor to provide printable object model data. The scaling is performed with reference to an origin at a centre of the usable build volume.

15 Claims, 9 Drawing Sheets

(51) Int. Cl.
*G05B 19/4099* (2006.01)
*G06F 119/18* (2020.01)

(56) References Cited

U.S. PATENT DOCUMENTS

| | | |
|---|---|---|
| 7,209,797 B2 | 4/2007 | Kritchman et al. |
| 8,784,723 B2 | 7/2014 | Kritchman |
| 9,060,832 B2 | 6/2015 | Karim et al. |
| 2013/0154161 A1 | 6/2013 | Schlienger et al. |
| 2014/0107823 A1 | 4/2014 | Huang |
| 2015/0176956 A1 | 6/2015 | Pettersson et al. |
| 2015/0374051 A1 | 12/2015 | Rauckman et al. |

COMPENSATING FOR SHRINKING OF OBJECTS IN 3D PRINTING

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, liquid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some printing processes that generate three-dimensional objects use data generated from a model of a three-dimensional object. This data may, for example, specify the locations at which to apply an agent to the build material, or where a build material itself may be placed, and the amounts to be placed. The data may be generated from a 3D representation of an object to be printed.

During a particular printing process or print job, multiple three dimensional objects may be printed within a fabrication chamber or build volume of a printer apparatus.

BRIEF DESCRIPTION OF DRAWINGS

For a more complete understanding, reference is now made to the following description taken in conjunction with the accompanying drawings in which.

DETAILED DESCRIPTION

Some examples described herein provide an apparatus and a method for processing data relating to a three dimensional object and/or for generating data that may be used to produce a three dimensional object.

During a particular printing process or print job, multiple three dimensional objects or parts may be printed within a fabrication chamber or usable build volume of a printer apparatus.

Some 3D printing technology works by printing 2D layers of a given thickness, one on top of another. Build material may be deposited, for example, on a print bed and processed layer by layer, for example within a fabrication chamber or usable build volume of the printer. The build material may be a powder-like granular material, which may for example be a plastic, ceramic or metal powder.

In some examples, at least one print agent may be selectively applied to the build material, and may be liquid when applied. For example, a fusing agent (also termed a "coalescence agent" or "coalescing agent") may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. In some examples, a detailing agent may also be used (also termed a "coalescence modifier agent" or "coalescing modifier agent"), wherein the detailing agent is used for example near edge surfaces of an object being printed.

Once the objects or objects are formed, or during their formation, the temperature decreases and the powder solidifies forming the final object or objects. During this cooling process, the printed objects can suffer from a shrinkage. This shrinkage may be dependent on the type of build material, cooling rate and/or print agent used.

This shrinkage means that a final printed object may not represent the object as described by the object model data received by the printer.

A usable build volume may be defined for a printer. The usable build volume determines the boundaries of where the printer can physically place agent fluids in order for parts or objects to be printed. A printer may therefore reject object model data which requests content to be printed outside of the usable build volume.

In some examples, a compensation or scaling is applied to object model data in order to compensate for the shrinking of objects, for example after or during printing. In other words, in some examples the objects are printed larger than the model originally requested by a predetermined factor such that once shrinking they are the size requested by the object model data.

Figure 1:
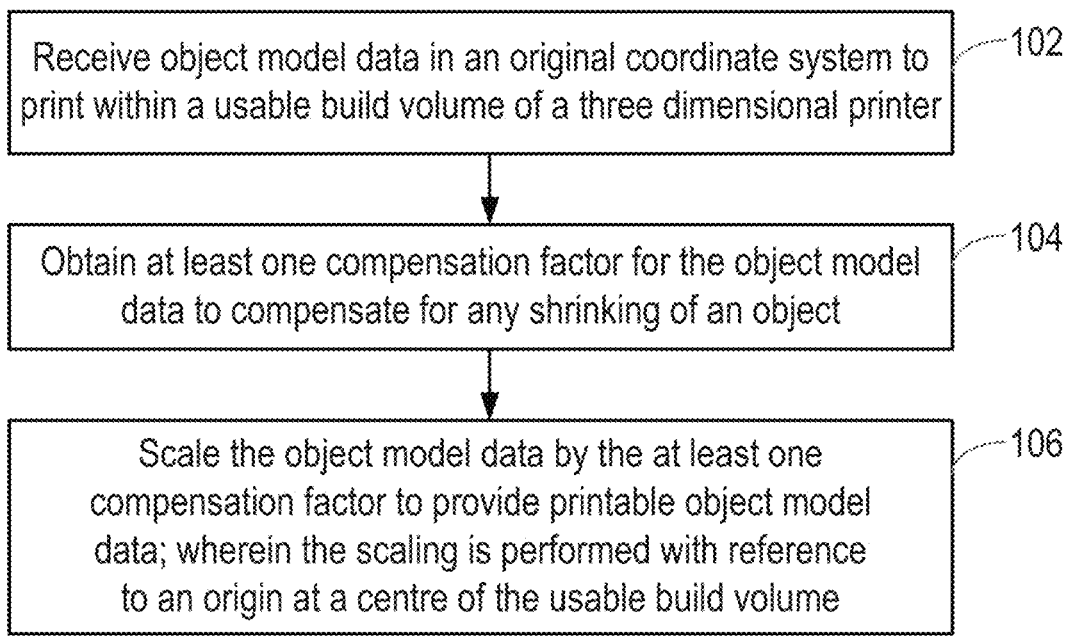
FIG. 1 is a flowchart of an example method of compensating for the shrinkage of objects.

FIG. 1 is an example of a method, which may be a method of compensating for the shrinkage of objects, for example after or during printing, and which may be computer implemented. The method of FIG. 1 may be performed, for example, by a three dimensional printer or an additive manufacturing apparatus. The method comprises, in block 102, receiving object model data in an original coordinate system to print within a usable build volume of the printer. For example, the object model data may comprise vectors positioning objects in three dimensional space. The coordinate system used to locate these objects is therefore original coordinate system.

The object model data may be received, for example, as part of a printing profile input into the printer, for example as part of a printing request file.

In block 104 the method comprises obtaining at least one compensation factor for the object model data to compensate for any shrinking of an object, for example after or during printing. The compensation factor again may be obtained, for example, from a printing profile input into the printer. In other examples, the at least one compensation factor may be obtained from within the printer. For example, the amount of shrinkage expected for a particular type of material may be stored within the printer, and the at least one compensation factor may be derived from this expected shrinkage.

In one example the compensation factor may relate to the build material and/or print agent, e.g. coalescing agent and/or coalescing modifier agent, used for the printing process. For example, a specific material may be known to shrink by a first factor in a first direction after or during printing, and therefore, in this example, the compensation factor may be the first factor in the first direction.

In one example, the at least one compensation factor may comprise three compensation factors which can be used to scale in three orthogonal directions corresponding to the X, Y and Z directions. In other examples, the at least one compensation factor may comprise three compensation factors to be used to scale in any three orthogonal directions.

In block 106 the method comprises scaling the object model data by the at least one compensation factor to provide printable model data, wherein the scaling is performed with reference to an origin at a centre of the usable build volume of the printer. Performing the scaling with reference to the centre of the usable build volume of the printer avoids displacing the printing to one side or another of the usable build volume which could affect the part quality of some printed objects, with regard to the X, Y positioning. It can also avoid any collision of objects due to the application of a scaling factor, for example that would otherwise be caused if the objects were scaled with reference to the centre of an object itself.

Furthermore, for a certain scaling factor, in some examples scaling with reference to an origin at a centre of the usable build volume of the printer means that the first allowable Z coordinate, where the z-axis is the vertical inter-layer axis, of printable content for that scaling factor is the same regardless of job size. This means that there is no need to add any unnecessary empty layers before the job content.

In contrast, if the scaling was applied from the centre of the object the first Z coordinate of printable content would change depending on the original size of the object being printed.

For example, if the at least one compensation factor comprises a compensation factor A to be applied in an X direction, then the object model data would be enlarged by A in the X direction from the centre of the usable build volume.

In another example, if the at least one compensation factor comprises three compensation factors, A, B and C, to be applied in the X, Y and Z directions, respectively, then the object model data would be enlarged by A in the X direction, B in the Y direction, and C in the Z direction from the centre of the usable build volume.

The application of the scaling will be described in greater detail with respect to the examples of FIGS. 2 to 5.

It will be appreciated that any number of compensation factors may be used to expand the object model data in different directions of the coordinate system.

Figure 2:
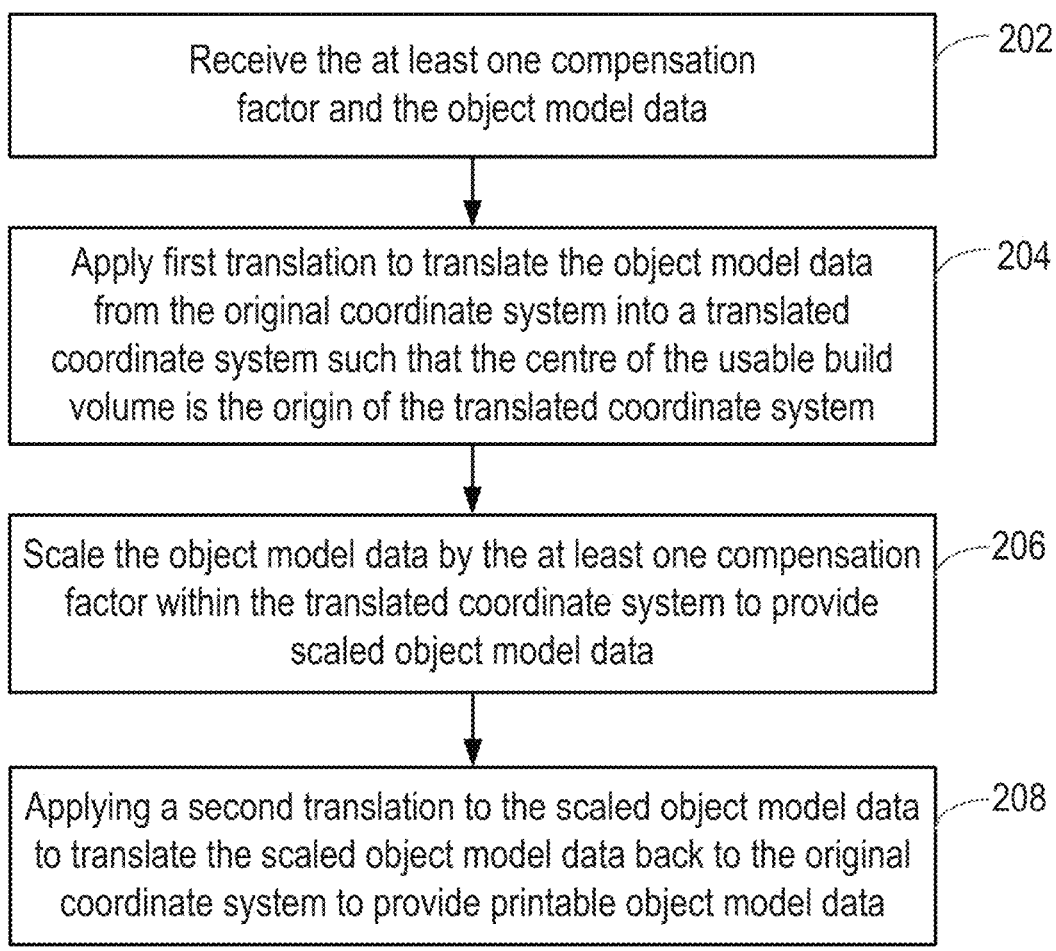
FIG. 2 is a flowchart of an example method of applying scaling to object model data to compensate for shrinkage of objects.

FIG. 2 is an example of a method, which may be a method of applying scaling to object model data to compensate for shrinkage of objects, for example after or during printing, and which may be computer implemented. The method of FIG. 2 may be performed, for example, by a three dimensional printer or an additive manufacturing apparatus.

The method of FIG. 2 describes an example of the block 106 of FIG. 1 in more detail.

In block 202 the method may comprise receiving the at least one compensation factor and the object model data.

In block 204 the method may comprise applying a first translation to translate the object model data from the original coordinate system into a translated coordinate system such that the centre of the usable build volume is the origin of the translated coordinate system.

Figure 3A:
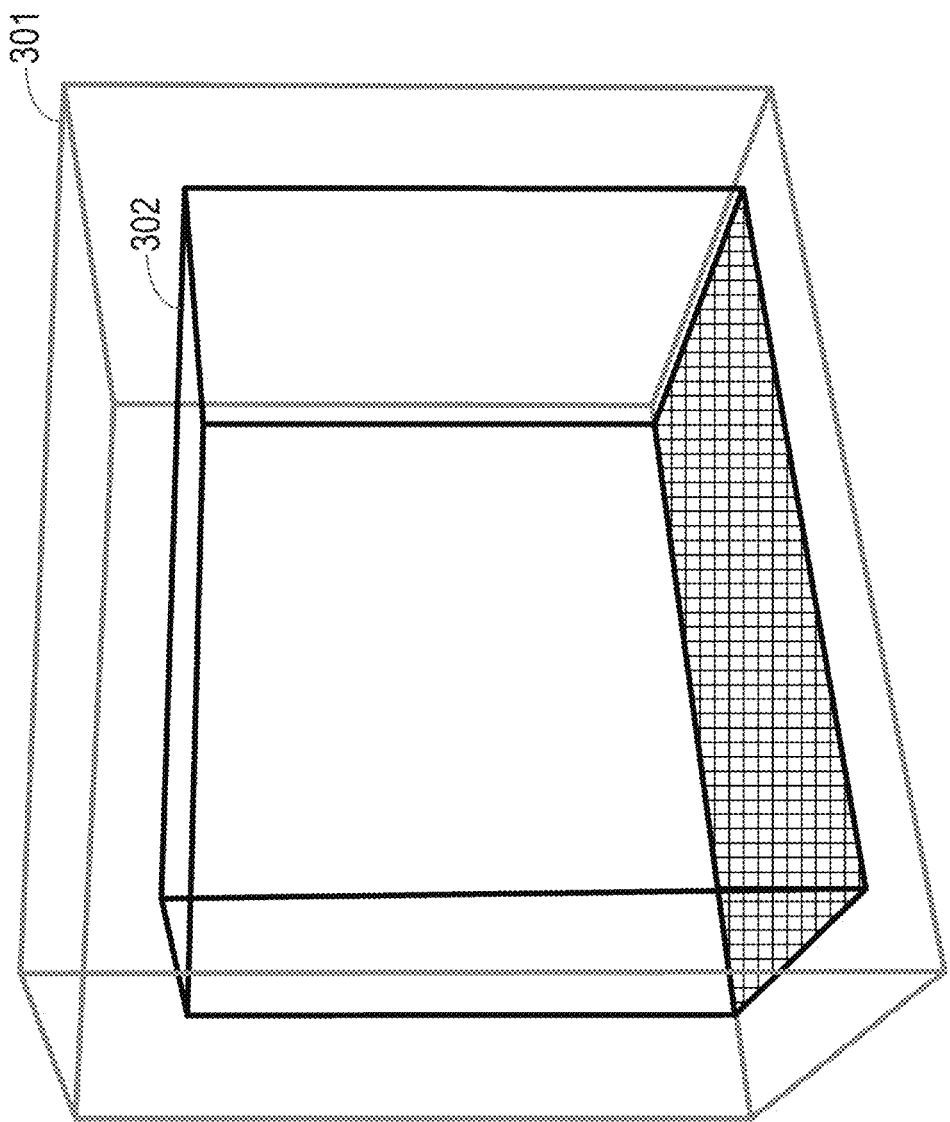
FIG. 3a is an example illustrating a build bed box and usable build volume of a printer.

FIG. 3a shows an example of the usable build volume as described herein. In a printer such as a 3D printer, a build bed box 301 determines where the printer can physically deposit print agent(s). A usable build volume 302 corresponds to a printable bed box, where objects can be placed in order to obtain optimal part quality. For example, the extremities of a build bed box 301 may have suboptimal properties, and therefore it may be useful to avoid using these areas for printing objects. For this reason, a printer may reject any print job request which comprises content outside this usable build volume 302.

Figure 3B:
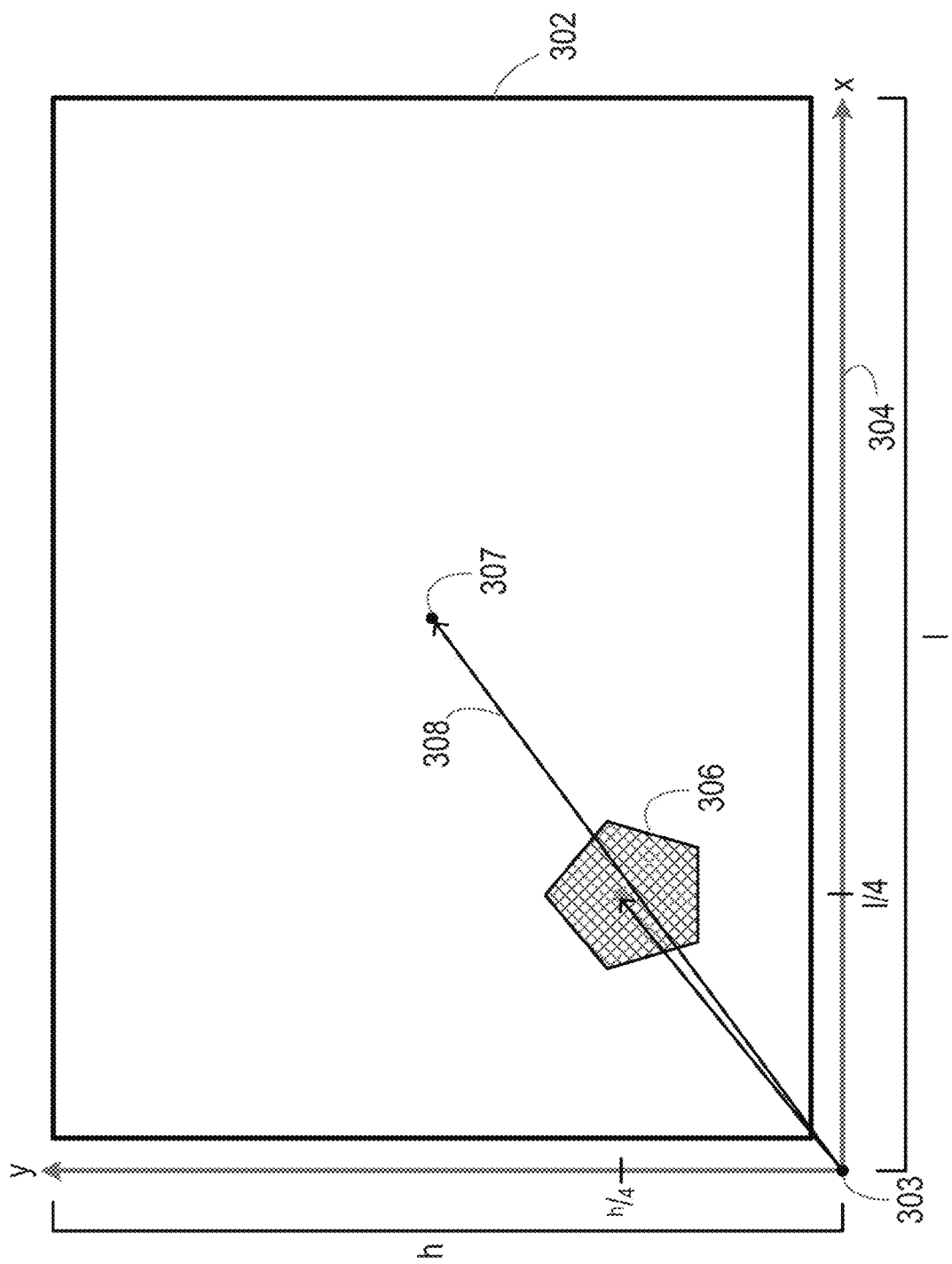
FIG. 3b is an example of a first translation from an original coordinate system to a translated coordinate system applied within a usable build volume in more detail.

FIG. 3b illustrates an example of the first translation in more detail. FIG. 3b is illustrated in two dimensions for clarity, however, it will be appreciated that the translations illustrated may be applied in three dimensions.

The usable build volume in FIG. 3b is represented by the rectangular box 302. The example of the original coordinate system 304 as shown comprises an X and a Y direction having an origin 303. The object 306 to be printed is positioned within the original coordinate system with its centre at $$\left(\frac{l}{4}, \frac{h}{4}\right)$$

where l is the length of the usable build volume along the X direction and h is the height of the usable build volume along the Y direction. For simplicity, in this example we have considered the distance between the usable build volume and the build bed box to be negligible. However, it will be appreciated that there may be some distance between the build bed box and the usable build volume. The first translation is depicted by the arrow 308 which translates the original coordinate system into the translated coordinate system with the origin of the translated coordinate system being at the centre 307 of the usable build volume 302. The first translation may be stored locally for later access.

Figure 4:
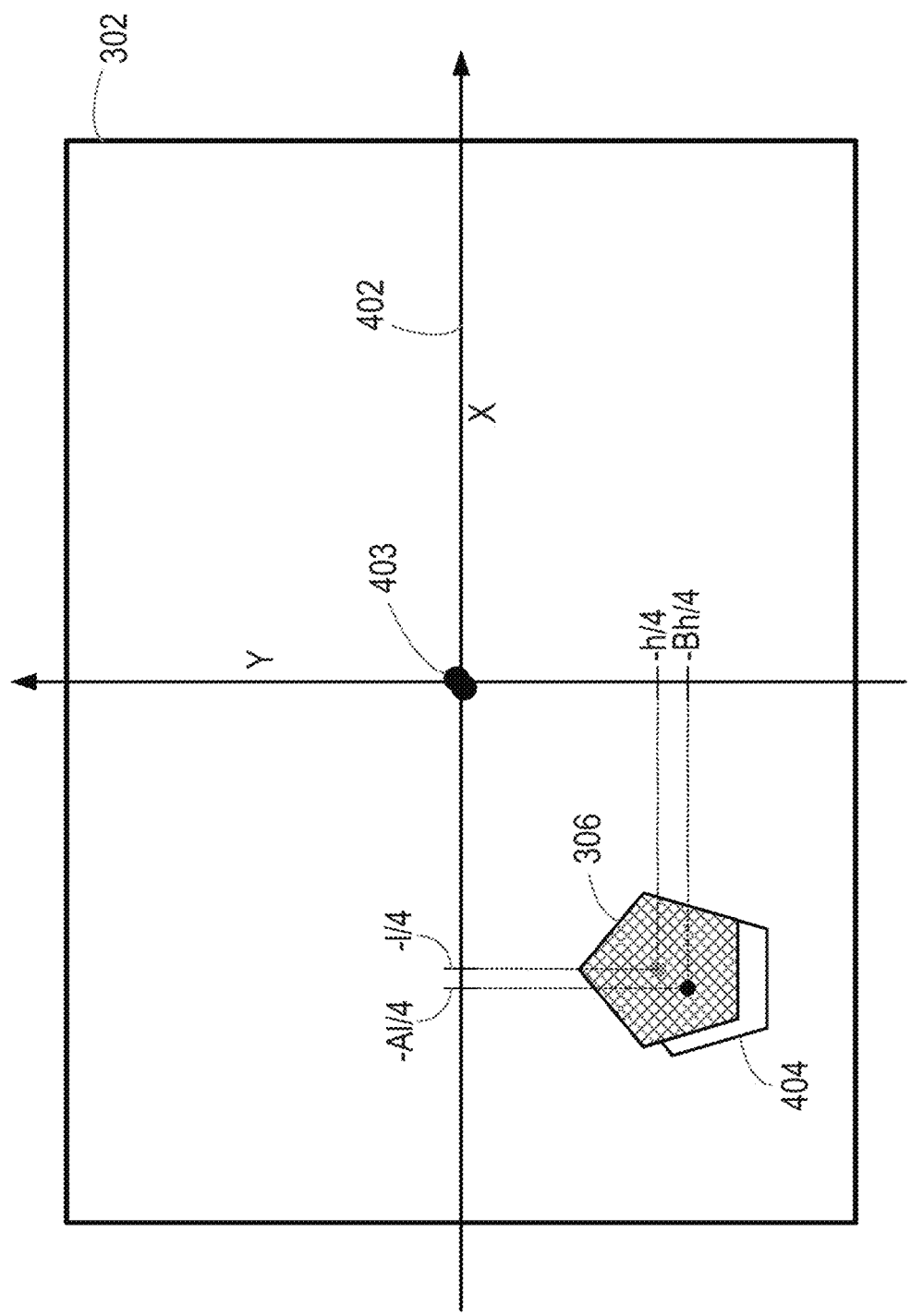
FIG. 4 illustrates an example of an object positioned in a usable build volume in a translated coordinate system.

FIG. 4 illustrates an example of the same object 306 positioned in the usable build volume 302 in the translated coordinate system 402. The translated coordinate system 402 comprises +/−X and +/−Y directions about an origin at the centre 403 of the usable build volume 302. As can be seen the centre of the object 306 (i.e. prior to being scaled) is now positioned at $$\left(-\frac{l}{4}, -\frac{h}{4}\right)$$

in the translated coordinate system 402.

Returning to FIG. 2, in block 206 the method may comprise scaling the object model data by the at least one compensation factor within the translated coordinate system to provide scaled object model data. In the example shown in FIG. 4 the compensation factor A is applied in the X direction, which expands the object model data, for example globally, in the X direction by A. A compensation factor of B is applied in the Y direction, which expands the object model data, for example globally, in the Y direction by B. This global expansion with reference to an origin at the centre 403 of the usable build volume 302 results in the scaled object model data object 404 (as illustrated in FIG. 4). The centre of the object 404 in the scaled object model data will therefore be given as $$\left(-\frac{Al}{4}, -\frac{Bh}{4}\right).$$

All points in the object model data will be scaled in the same way with reference to an origin at the centre of the usable build volume In block 208 of the example method of FIG. 2 the method may comprise applying a second translation to the scaled object model data to translate the scaled object model data back to the original coordinate system to provide printable object model data. The centre of the object 404 in the printable object model data is therefore $$\left(\frac{(2-A)l}{4}, \frac{(2-B)h}{4}\right).$$

Figure 5:
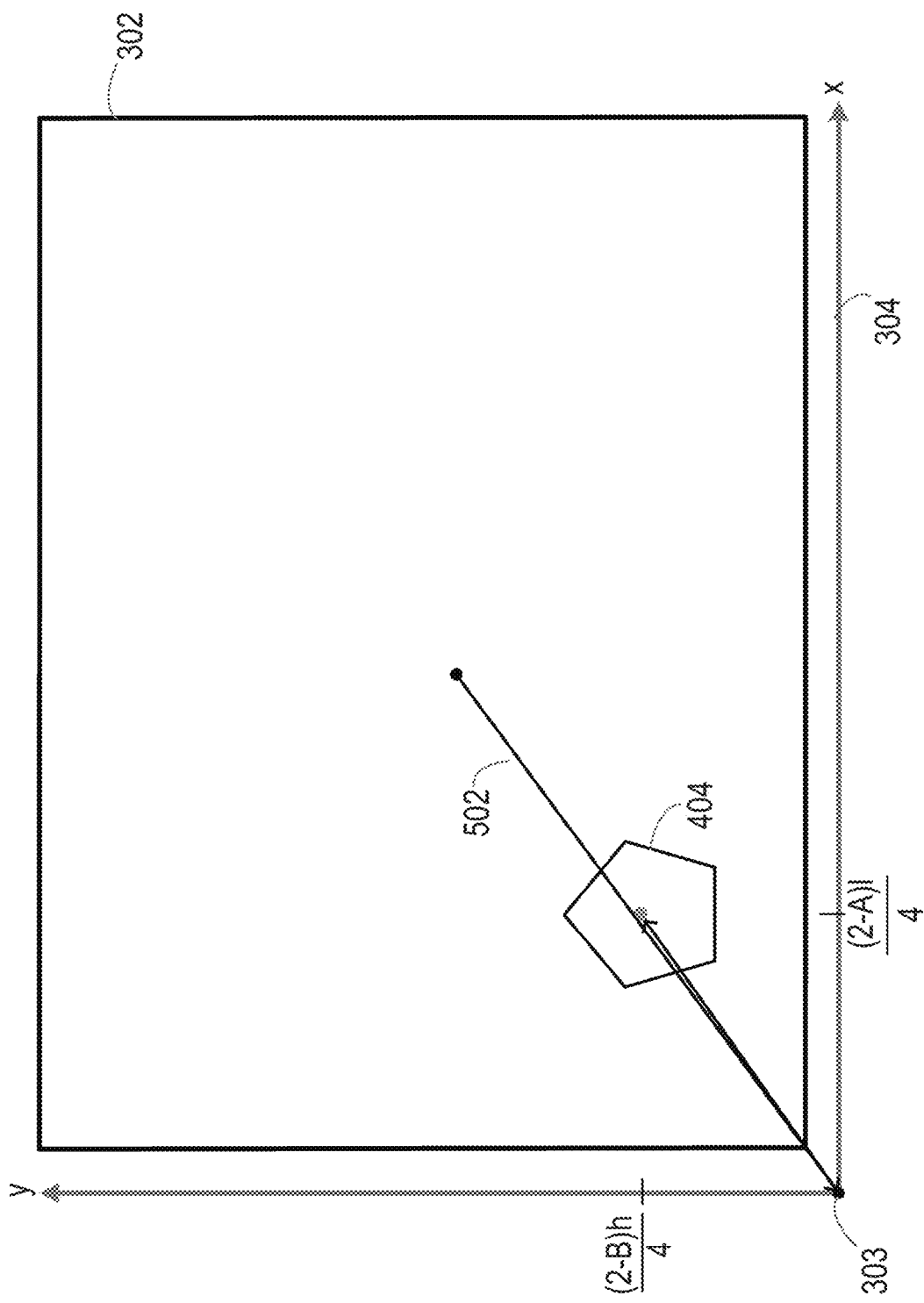
FIG. 5 is an example of a second translation from a translated coordinate system to an original coordinate system applied within a usable build volume.

FIG. 5 illustrates an example of the second translation in more detail. The second translation depicted by the arrow 502 translates the translated coordinate system 402 back into the original coordinate system 304. The scaled object 404 is then described in the original coordinate system 304 as printable object model data ready for printing.

For the Z coordinates, as previously mentioned, by scaling with reference to the centre of the usable build volume the first Z coordinate which is available for printable content is the same for a particular scaling factor, regardless of job size. For example, for a usable build volume extending in the Z direction from 10 mm to 300 mm in the original coordinate system, and a scaling factor of 3%, e.g. relating to thermal compensation, an object to be printed from 10 mm to 20 mm in the Z direction will have scaled job content that will print from 5.65 mm to 15.95 mm, and an object to be printed from 10 mm to 200 mm in the Z direction will have scaled job content that will print from 5.65 mm to 201.35 mm. The minimum Z value for the 3% scaling factor is therefore 5.65 mm in this example, regardless of the size of the print job.

In contrast, if for the above example the scaling is applied from the centre of the object, rather than the centre of the usable build volume as above, for the object to be printed from 10 mm to 20 mm in the Z direction the scaled job content would print from 9.85 mm to 20.15 mm, and for the object to be printed from 10 mm to 200 mm in the Z direction the scaled job content would print from 7.15 mm to 202.85 mm. The minimum Z value is therefore dependent on the size of the object to be printed.

Figure 6:
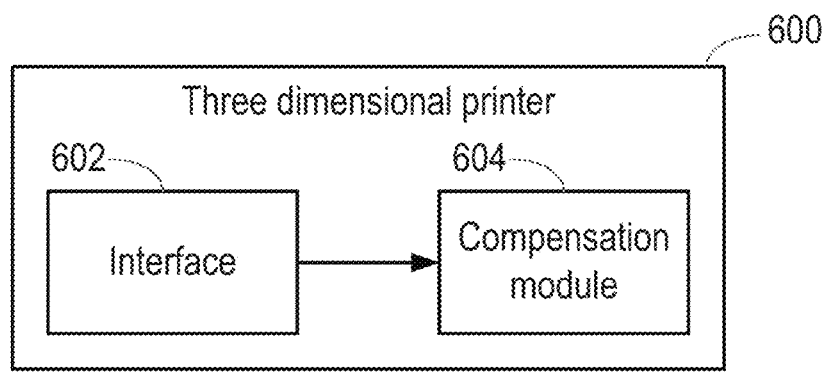
FIG. 6 illustrates an example of a three dimensional printer.

FIG. 6 illustrates an example of a three dimensional printer 600. The three dimensional printer 600 comprises an interface module 602 and a compensation module 604. The interface module receives object model data in an original coordinate system to print within a usable build volume of the printer, and obtains at least one compensation factor for the object model data for compensating for any shrinking of an object.

The compensation module 604 scales the object model data by the at least one compensation factor to provide printable object model data, wherein the scaling is performed with reference to an origin at the centre of the usable build volume of the three dimensional object generating apparatus.

Figure 7:
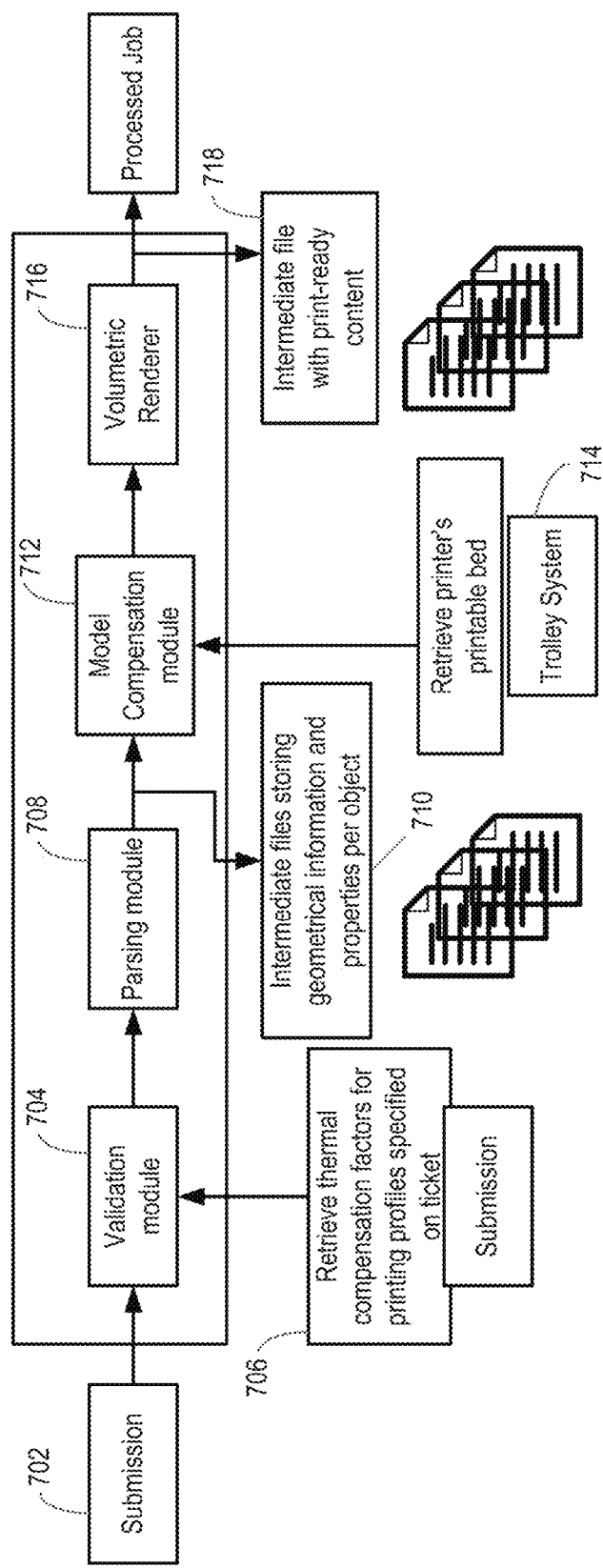
FIG. 7 illustrates an example of a three dimensional printer.

FIG. 7 illustrates an example of a three dimensional printer 700. The three dimensional printer 700 receives a printing request file submission 702 for a print job.

The printing request file may, in some examples, specify the print job as a collection of models representing the objects to be printed, where every object comprises, for example, a translation matrix which positions the object in the build bed box (301 of FIG. 3*a*). During composition of such a request, the content that needs to be placed within the usable build volume may be taken into account, despite the build bed box determining the origin of the coordinates of the printer.

When a print job is submitted, in some examples, this print job is validated at a validation module 704, for example by determining if a print job ticket is valid. The thermal compensation factors 706 for the printing profile specified in the printing request file submission can then be obtained. The printing request file can then be parsed at parsing module 708 to separate each individual object model data into separate intermediate files 710. These intermediate files 710 may be stored for later use. The intermediate files 710 store the geometrical representation of the object as defined by the printing request file submission 702.

In some examples, a model compensation module 712 may apply the compensation factors to the intermediate files generating printable object model data as described above. To do this the model compensation module may, for example, also receive information regarding the size of the usable build volume of the trolley system 714 of the printer. As a printer may therefore reject object model data which needs content to be printed outside of the usable build volume, the model compensation module may ensure that the compensation applied does not cause the object model data to be scaled beyond the boundaries of the usable build volume.

In some examples, the printing request file submissions 702 are created with a maximum size that allows the largest conceivable compensation factor, for example, 5% or 1.05, to be applied without causing the object model data to extend beyond the boundaries of the usable build volume.

Once the printable object model data has been produced, it is processed, for example, in a volumetric renderer 716 to provide print-ready content. This file containing the print ready content 718 can also be stored for later use.

The print ready content 718 can then be forwarded for printing.

As the printer is aware of both the intermediate files 710 and the print-ready content 718, it is aware of both the size of the model in the printing request file submission and the size of the scaled model used to compensate for shrinkage. By knowing the user-defined dimensions in the printing request file submission the printer can provide information which is more relevant to the user as it can be compared with the original model's dimensions. By knowing the scaled model dimensions the printer can have a better control over the dimensions used in the usable build volume and also provide better consumption estimations.

The information regarding the original and scaled models can also be used to compute job statistics and provide richer information to any cloud services associated with the printer.

Figure 8:
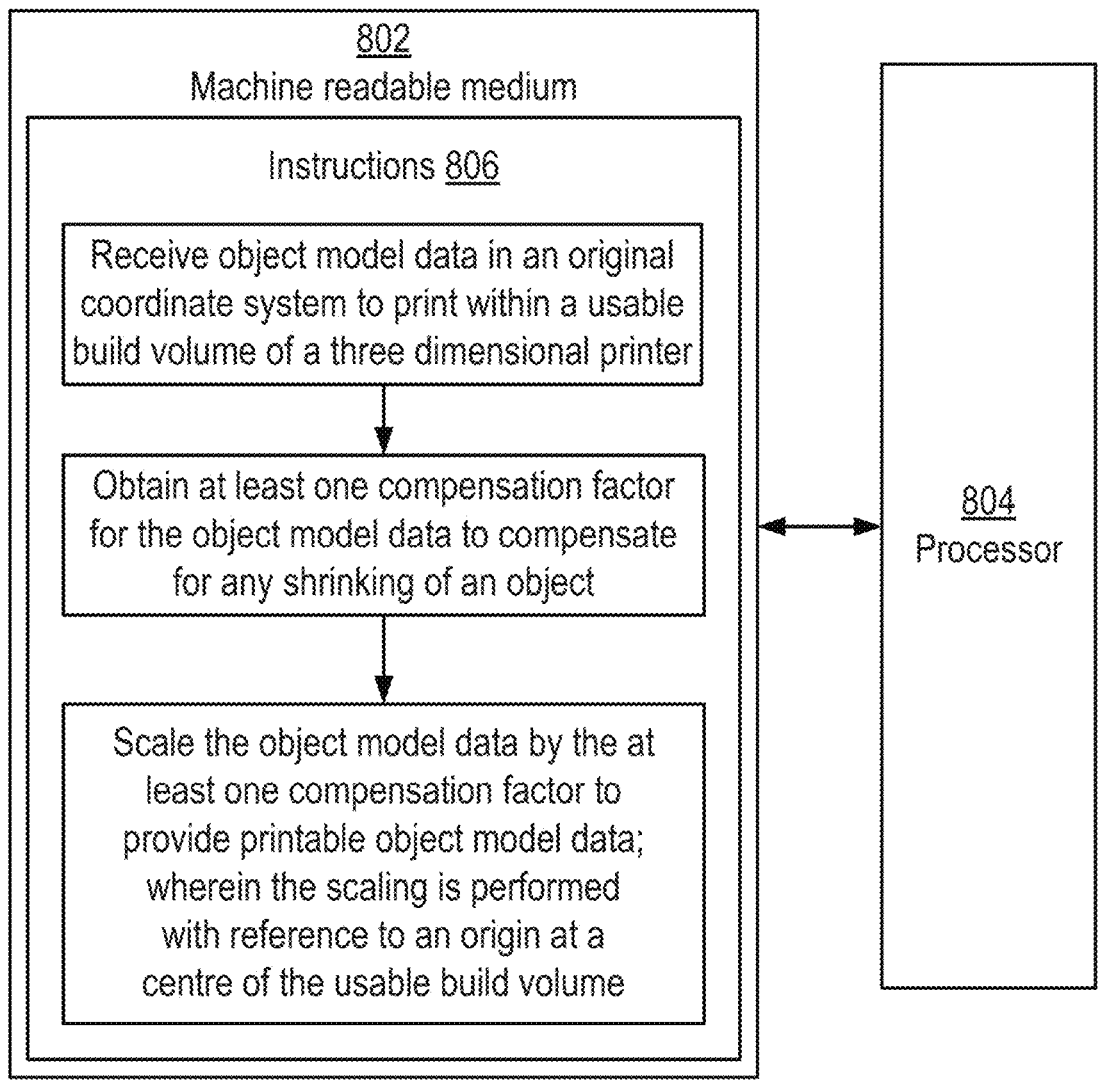
FIG. 8 illustrates an example of a machine readable medium in association with a processor.

FIG. 8 illustrates an example of a machine readable medium 802 in association with a processor 804. The machine readable medium 802 stores instructions 806 which, when executed by the processor 804 cause the processor 804 to carry out certain processes. In this example, the instructions 806 comprise instructions to: receive object model data in an original coordinate system to print within a usable build volume of a three dimensional printer; receive at least one compensation factor for the object model data to compensate for any shrinking of an object, for example after or during printing; and scale the object model data by the at least one compensation factor to provide printable object model data, wherein the scaling is performed with reference to an origin at a centre of the usable build volume.

In some examples, the machine readable medium 802 may further comprise instructions which, when executed by a processor cause the processor to print the printable object model.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the compensation module 604) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. A method comprising:
   receiving object model data in an original coordinate system to print within a usable build volume of a three dimensional printer;
   obtaining at least one compensation factor for the object model data to compensate for any shrinking of an object;
   scaling the object model data by the at least one compensation factor to provide printable object model data; wherein
   the scaling is performed with reference to an origin at a center of the usable build volume.

2. The method of claim 1 further comprising printing an object according to the printable object model data.

3. The method as claimed in claim 1 wherein the at least one compensation factor comprises a first compensation factor to be applied in a first direction in the original coordinate system.

4. The method as claimed in claim 1 wherein the at least one compensation factor comprises three compensation factors to be applied to three orthogonal directions in the original coordinate system.

5. The method as claimed in claim 1 further comprising receiving a printing profile comprising the object model data and the at least one compensation factor.

6. The method as claimed in claim 1 wherein the at least one compensation factor is related to a type of material specified in the object model data.

7. A three dimensional (3D) printer comprising:
   an interface to receive object model data in an original coordinate system to print within a usable build volume of the three dimensional printer; and to receive at least one compensation factor for the object model data to compensate for any shrinking of an object;
   a compensation module to scale the object model data by the at least one compensation factor to provide printable object model data; wherein
   the scaling is performed with reference to an origin at a center of the usable build volume.

8. The three dimensional printer of claim 7 further comprising object printing apparatus to print an object according to the printable object model data.

9. The three dimensional printer as claimed in claim 7 wherein the at least one compensation factor comprises a first compensation factor to be applied in a first direction in the original coordinate system.

10. The three dimensional printer as claimed in claim 7 wherein the at least one compensation factor comprises three compensation factors to be applied to three orthogonal directions in the original coordinate system.

11. The three dimensional printer as claimed in claim 7 wherein the interface receives a printing profile comprising the object model data and the at least one compensation factor.

12. The three dimensional printer as claimed in claim 7 wherein the at least one compensation factor is related to a type of material specified in the object model data.

13. A machine readable medium storing instructions which, when executed by a processor cause the processor to:
receive object model data in an original coordinate system to print within a usable build volume of a three dimensional printer;
obtain at least one compensation factor for the object model data to compensate for any shrinking of an object;
scale the object model data by the at least one compensation factor to provide printable object model data; wherein
the scaling is performed with reference to an origin at a center of the usable build volume.

14. The method of claim 1 wherein the scaling of the object model data by the at least one compensation factor comprises:
applying a first translation to translate the object model data from the original coordinate system into a translated coordinate system such that the center of the usable build volume is the origin of the translated coordinate system;
scaling the object model data by the at least one compensation factor within the translated coordinate system to provide scaled object model data; and
applying a second translation to the scaled object model data to translate the scaled object model data back to the original coordinate system to provide printable object model data.

15. The three dimensional printer of claim 7 wherein the compensation module is to scale the object model data by the at least one compensation factor by:
applying a first translation to translate the object model data from the original coordinate system into a translated coordinate system such that the center of the usable build volume is the origin of the translated coordinate system;
scaling the object model data by the at least one compensation factor within the translated coordinate system to provide scaled object model data; and
applying a second translation to the scaled object model data to translate the scaled object model data back to the original coordinate system to provide printable object model data.

* * * * *